(12) United States Patent
Denk et al.

(10) Patent No.: US 8,294,314 B2
(45) Date of Patent: Oct. 23, 2012

(54) MAGNETIC BEARING CONTROL DEVICE HAVING A THREE-PHASE CONVERTER, AND USE OF A THREE-PHASE CONVERTER FOR CONTROLLING A MAGNETIC BEARING

(75) Inventors: Joachim Denk, Nürnberg (DE); Hans-Georg Köpken, Erlangen (DE); Dietmar Stoiber, Fürth (DE); Bernd Wedel, Möhrendorf (DE)

(73) Assignee: Siemens Aktiengesellschaft, München (DE)

( * ) Notice: Subject to any disclaimer, the term of this patent is extended or adjusted under 35 U.S.C. 154(b) by 146 days.

(21) Appl. No.: 12/665,506

(22) PCT Filed: Oct. 2, 2007

(86) PCT No.: PCT/EP2007/060413
§ 371 (c)(1),
(2), (4) Date: Dec. 18, 2009

(87) PCT Pub. No.: WO2008/154962
PCT Pub. Date: Dec. 24, 2008

(65) Prior Publication Data
US 2010/0181855 A1    Jul. 22, 2010

(30) Foreign Application Priority Data
Jun. 20, 2007   (DE) .......................... 10 2007 028 229

(51) Int. Cl.
*H02K 7/09* (2006.01)
(52) U.S. Cl. ...................................... 310/90.5

(58) Field of Classification Search ................. 310/90.5; 318/609, 610, 630, 632; 361/144, 146; *H02K 7/09*
See application file for complete search history.

(56) References Cited

U.S. PATENT DOCUMENTS

| | | | |
|---|---|---|---|
| 3,937,533 A | 2/1976 | Veillette | |
| 4,642,501 A * | 2/1987 | Kral et al. | 310/90.5 |
| 5,053,662 A * | 10/1991 | Richter | 310/90.5 |
| 5,376,871 A * | 12/1994 | Takara et al. | 318/610 |
| 6,365,996 B2 * | 4/2002 | Schob | 310/90.5 |
| 6,559,567 B2 * | 5/2003 | Schob | 310/90.5 |

FOREIGN PATENT DOCUMENTS

| | | |
|---|---|---|
| DE | 23 53 342 A1 | 5/1978 |
| DE | 100 19 761 A1 | 12/2000 |

(Continued)

*Primary Examiner* — Quyen Leung
*Assistant Examiner* — Thomas Truong
(74) *Attorney, Agent, or Firm* — Henry M. Feiereisen, LLC (57) ABSTRACT

The invention relates to a magnetic bearing control device and the use of a three-phase converter for controlling a magnetic bearing. According to the invention, a three-phase converter (70) is used for controlling a magnetic bearing (10, 66, 68), all three phase currents (40, 42, 44) of the converter (70) being used for controlling the magnetic bearing (10, 66, 68). A first solenoid of a couple of solenoids (10) of the magnetic bearing (10, 66, 68) is connected to a first (U) and a third (W) phase current output of the converter (70) while a second solenoid of the couple of solenoids (10) is connected to the first (U) and a second (V) phase current output of the converter such that the couple of solenoids (10) can be differently controlled by means of said one converter (70). The converter (70) can also be connected to magnetic bearings that already have a bias winding, which is advantageous for retrofitting such existing magnetic bearings, for example.

7 Claims, 6 Drawing Sheets

FOREIGN PATENT DOCUMENTS

| | | |
|---|---|---|
| DE | 103 53 101 A1 | 6/2005 |
| DE | 10 2004 024 883 A1 | 12/2005 |
| EP | 0 989 315 A1 | 3/2000 |
| EP | 1 158 848 A1 | 11/2001 |
| JP | 8 145056 A | 6/1996 |
| WO | WO 97/07341 A1 | 2/1997 |

* cited by examiner

MAGNETIC BEARING CONTROL DEVICE HAVING A THREE-PHASE CONVERTER, AND USE OF A THREE-PHASE CONVERTER FOR CONTROLLING A MAGNETIC BEARING

CROSS-REFERENCES TO RELATED APPLICATIONS

This application is the U.S. National Stage of International Application No. PCT/EP2007/060413, filed Oct. 2, 2007, which designated the United States and has been published as International Publication No. WO 2008/154962 and which claims the priority of German Patent Application, Serial No. 10 2007 028 229.1, filed Jun. 20, 2007, pursuant to 35 U.S.C. 119(a)-(d).

BACKGROUND OF THE INVENTION

The invention relates to a magnetic bearing control device and to the use of a three-phase converter for magnetic bearing control.

Electromagnets are used for actively regulated magnetic bearing arrangements. Premagnetization and rapid regulation of the force-forming current are required for position stabilization, for this purpose.

Essentially, two versions of magnetic bearings such as these are known:

On the one hand there are magnetic bearings with a premagnetization winding by means of which a basic magnetic field can be produced. In this case, a control field winding also exists, by means of which a desired force is applied by means of a regulation technique to the object to be borne.

Furthermore, magnetic bearings exist which have no basic field winding, that is to say no windings by means of which a premagnetization can be set. The regulation technique which is used in this case is based essentially on the so-called difference drive.

In known magnetic bearings with a separate basic field winding and control field winding, the premagnetization field is produced by a constant current, which is normally generated by a first power amplifier. Field gain or field attenuation of the premagnetization field is achieved by means of a current in the control field winding, which is normally generated by a second power amplifier.

If, for example, a number N of magnetic bearings are now used on a magnet spindle, then the premagnetization current for all N magnetic bearings can be applied by the first power amplifier, as a consequence of which a total of N+1 power amplifiers are required in this case.

As already mentioned, a difference drive is performed for commercially available magnetic bearings without a basic field winding, requiring two power amplifiers, for each magnetic bearing, and therefore a total of 2×N power amplifiers.

Figure 1:
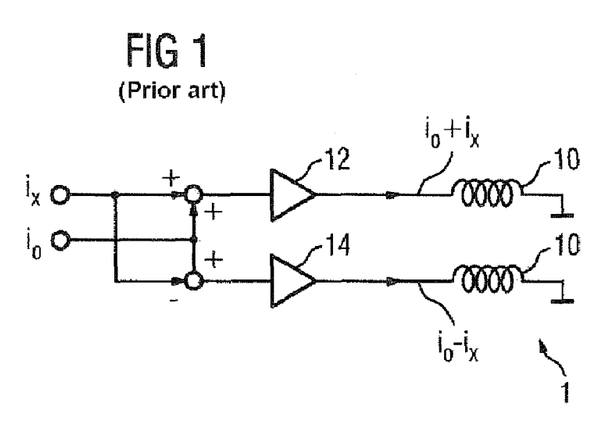
FIG. 1 shows a prior art magnetic bearing with a basic field winding and a control field winding.
Figure 2:
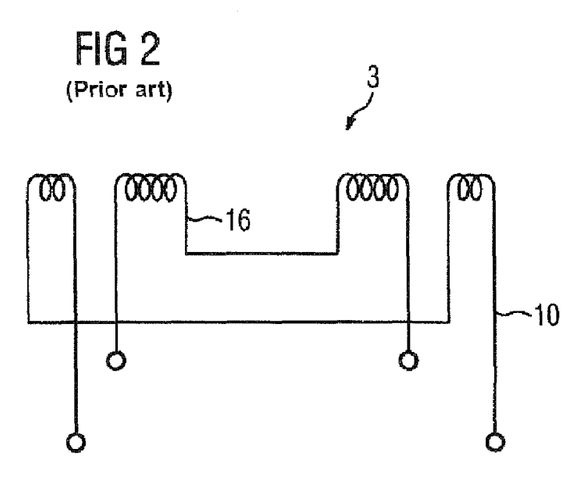
FIG. 2 shows another prior art magnetic bearing with a basic field winding and a control field winding.

FIGS. 1 and 2 respectively show a difference drive for a magnetic bearing and a magnetic bearing with both a basic field winding and a control field winding.

In this case, FIG. 1 shows two power amplifiers 12, 14 which are used to provide the difference drive for the control field winding 10. For this purpose, a premagnetization current $i_0$ is fed to both power amplifiers 12, 14 and, in the case of the first power amplifier 12, the control current $i_x$ is added to this and, in the case of the second power amplifier 14, the control current $i_x$ is subtracted from the premagnetization current $i_0$.

The constant current $i_0$ is therefore applied as a premagnetization current to both coils of the control field winding 10 for the difference drive as shown in FIG. 1. By way of example, this current is assumed to be 10 amperes, which flows uniformly in both coils, as a result of which the current through the first coil is equal to that through the second coil. Physically, the two coils are generally arranged vertically one above the other. If the intention is now to apply a force to an object which is located between the coils, for example a rotor, then the current in one of the coils must be increased, and that in the other must be decreased. This is done by means of the control current, which increases the current in one coil by addition to the premagnetization current, and decreases the current in the other coil by subtraction from the premagnetization current. For example, if the control current is 2 amperes, then the first coil carries a current of 12 amperes, while the second coil carries only 8 amperes. This considerably amplifies the magnetic field in the first coil in comparison to the magnetic field in the second coil, increasing the force acting, for example upwards. This allows desired forces on the object to be borne between the coils to be set by means of the control current. In control engineering terms, the magnetic bearing 1 shown in FIG. 1 is therefore based on deliberately increasing the magnetic field of one coil and, associated with this, decreasing the magnetic field of the other coil, of the control field winding 10.

FIG. 2 shows, schematically, a further known magnetic bearing 3, in the form of a magnetic bearing with both a basic field winding 16 and a control field winding 10.

In contrast to the embodiment shown in FIG. 1, one additional power amplifier is required in this case in order to generate the premagnetization current for the basic field winding 16. However, the number of power amplifiers required in comparison to the embodiment shown in FIG. 1 is decreased the greater the number of magnetic bearings that are provided for the application, since the premagnetization current of all the magnetic bearings which are used can normally be produced by a single power amplifier.

Therefore, until now, specific and therefore expensive power amplifiers and associated regulators have been required for operation of known magnetic bearings.

One alternative to power amplifiers such as these is disclosed in laid-open specification DE 10 2004 024 883 A1, in which magnetic bearings can also be operated using standard converters in a machine-tool converter system.

However, in this case, only two phases of the converter are used to drive the magnetic bearings. N+1 converters are therefore required to drive the magnetic bearing system when there are N magnetic bearings with premagnetization windings. If these magnetic bearings are not fitted with any premagnetization windings, 2×N converters are required.

SUMMARY OF THE INVENTION

Against the background of this prior art from the applicant, the present invention is based on the object of designing magnetic bearing control by means of a converter to be more efficient, with the particular aim of reducing the number of converters required.

In addition to said prior art from the applicant, WO 97/07341 discloses a radial active magnetic bearing apparatus in which three distributed electromagnets are provided and premagnetization is required. However, the main aim of the present invention relates to a difference drive for two magnet coils per degree of freedom of the magnetic bearing. In the case of a magnetic bearing with two desired degrees of freedom, for example, the present invention therefore leads to the use of two three-phase converters, each of which drives one magnet coil pair. There is no need for premagnetization in this case. The invention also relates in a preferred manner to axial bearings, and not to radial bearings.

According to the invention, the object is achieved by the use of a three-phase converter for controlling a magnetic bearing, wherein all three phase currents of the converter are used to control the magnetic bearing.

The invention equally leads to a magnetic bearing control device having a three-phase converter with three phase current outputs, which is designed to control a magnetic bearing, wherein all three phase currents of the converter are used to control the magnetic bearing in that a first magnet coil of a magnet coil pair of the magnetic bearing is connected to a first phase current output and to a third phase current output of the converter, and wherein a second magnet coil of the magnet coil pair is connected to the first phase current output and to a second phase current output of the converter, thus providing a difference drive for the magnet coil pair by means of one converter.

The invention is in this case based on the consideration that a three-phase converter as known per se is suitable not only for production of rotating fields for polyphase motors, but that the three phase currents which can be produced by the converter can also be used for other purposes:

One fundamental idea of the present invention is now to use the three phase current outputs of the converter as two currents, which can be produced independently of one another, in the form of a difference drive for a magnetic bearing.

The way in which this can be achieved will now be explained in the following text.

Figure 3:
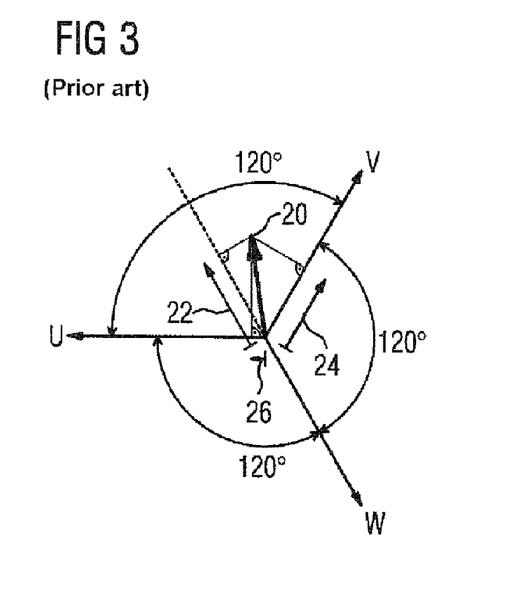
FIG. 3 shows an exemplary prior art polyphase vector.

Known converters according to the prior art are designed for the operation of three-phase polyphase motors. In this case, a polyphase vector is produced which exists as a computation variable in the converter and is distributed between the three phases U, V and W of the converter. By way of example, FIG. 3 shows one such polyphase vector 20. This computation variable polyphase vector 20 is described in the coordinate system of the converter by the length and angle of current vector components 22, 24 and 26, with the respective angle of the current vector components relating to the converter-fixed phase system U, V and W. In this case, the current vector components 22, 24 and 26 are the projections of the current vector 20 in the directions U, V and W, respectively. In consequence, these individual phase currents are scalars, which result from said projection of the current vector 20 onto the direction vector of the respective phase. The three direction vectors of the polyphase system U, V and W are each offset through 120° with respect to one another, as a result of which the same angles are included between them. Projections which point in the direction of the respective direction vector are considered to be positive. When the projections point in the opposite direction to the direction vector, they are considered to be negative. In an idealized polyphase system, the geometric configuration of phase currents means that their sum always disappears, that is to say it is equal to zero. The disappearance of the phase current sum is an essential characteristic of any polyphase system.

Figure 4:
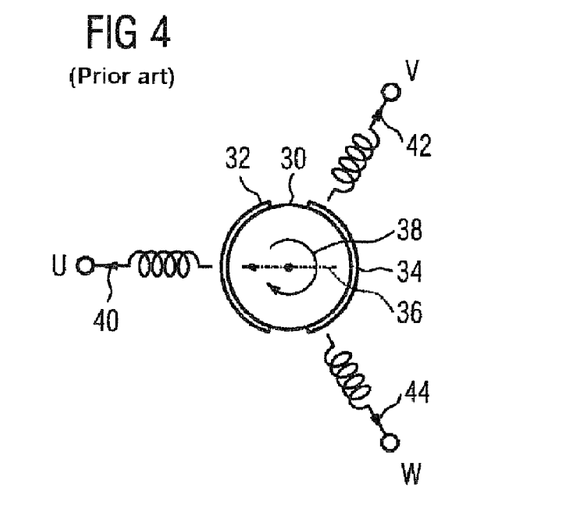
FIG. 4 shows schematically a prior art permanent-magnet synchronous motor operated by a converter.

FIG. 4 now schematically illustrates a permanent-magnet synchronous motor which is operated by a converter. For the sake of simplicity, this motor is assumed to have one magnet pole pair. In this case, the motor has an associated rotor 30. Said pole pair comprises a magnetic north pole 32 and a magnetic south pole 34. This pole pair is assumed to be firmly anchored to the rotor. It is intrinsically rigid and rotates with the rotor angle. A magnetic axis 36, which in FIG. 4 points from the magnetic south pole 34 to the magnetic north pole 32, can be associated with the pole pair. A rotation direction 38 describes the rotation of the rotor caused by an externally applied rotating field which acts on the pole pair.

The stator of the motor (not illustrated in any more detail here) has three fixed-position coils which are arranged at an angle of 120°. In the present illustration in FIG. 4, the coils are assumed to be connected in star, although the star point is not shown in any more detail. Each coil is associated with one phase of the converter. The phase currents 40, 42 and 44 produced by the converter flow through the three coils. In this case, each coil then produces a magnetic field whose strength is governed by the magnitude of the respective phase current. The orientation of the field is determined by the mathematical sign of the respective phase current. The three fields of the coils are therefore superimposed, resulting in a resultant field in the interior of the stator whose strength and orientation correspond to the computation variable polyphase vector mentioned initially.

During operation of the synchronous motor, the direction of the current vector is slaved exactly to the angle of the magnetic axis 36 of the rotor such that the computation variable current vector and the magnetic axis 36 of the rotor 30 form a defined angle with respect to one another. Of the theoretically possible angles which the current vector can assume with respect to the magnetic axis two angles are of particular interest here:

1. The current vector which points in the direction of the magnetic axis. This alignment of the current vector does not produce any torque, and is referred to as d-current. As is known, a magnetic axis which can rotate (for example a compass needle) is aligned in the direction of the lines of force of an external magnetic field. However, in this case, the magnetic axis which can rotate as illustrated in FIG. 4 has already been completely aligned with the external field, as result of which the magnetic axis will not rotate any further.
2. The current vector which is at right angles (90°) to the magnetic axis 26. This alignment produces the maximum torque and is referred to as the q-current. The larger the included angle between the external field and the magnetic axis which can rotate, the greater is the torque that acts. Mathematically, the torque is described by the cosine of the included angle. The greatest torque, therefore, is when the included angle is 90°.

The two described directions d and q, which are of particular interest, of the current vector are at right angles to one another. One direction, the d-current, does not produce any torque, while in contrast, the other direction, the q-current, produces a torque. Although the d-current does not produce any torque, it is nevertheless of importance for the operation of a synchronous motor: a negative d-current (which points in the opposite direction to the magnetic axis) reduces the terminal voltage of the motor. In the specialist literature, it is therefore often referred to as the field weakening current.

It has been found to be advantageous for any desired current vector to be considered as linear combination of a d-current and a q-current. These d- and q-currents can be regarded as computation variables which are distributed individually between the three phases U, V and W, as shown in the illustration in FIG. 4.

According to the prior art, a motor is used to produce torque. The synchronous motor is therefore operated in the basis rotation-speed range such that the d-component of the current vector tends to zero. A desired torque is set using the q-current. At high rotation speeds, a (negative) d-current is also produced, by means of which the terminal voltage of the motor is reduced to the desired extent. During operation of a synchronous motor according to the prior art, the d- and q-currents carry out different, mutually decoupled functions, and are therefore controlled independently of one another.

This capability to produce said currents independently is made use of in the present invention to generate the two independent currents which are required for the difference drive for a magnetic bearing.

In contrast, when a motor is driven by a converter, the d- and q-currents are always aligned synchronously with respect to the rotor angle, that is to say they are synchronously slaved to the magnetic axis. For this purpose, the converter is provided with information about the instantaneous alignment of the magnetic axis, also referred to as the rotor position angle.

In the following text, in order to explain the use of the converter for driving a magnetic bearing, it will now be assumed that the rotor of the motor is stationary. In this case, as is shown in FIG. 4, the magnetic axis is aligned in the direction of the phase U. The q-current, that is to say the current vector which forms the torque, is at right angles to the magnetic axis and therefore forms a right angle with the stator axis in the direction of the phase U.

Figure 5:
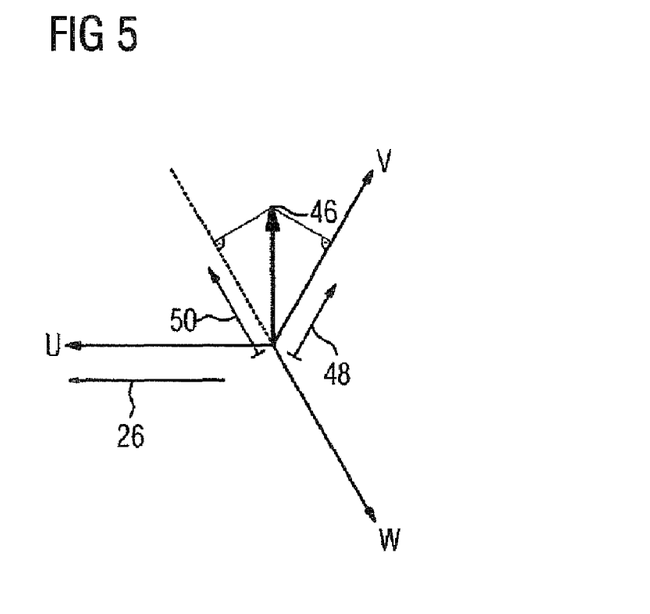
FIG. 5 shows the direction of the q-current in relation to the phase current for the rotor in the position of FIG. 4.

This results in the situation illustrated in FIG. 5.

When the position of the magnetic axis 36 is frozen in this way in the phase direction U which corresponds to the direction of the phase coil U of the stator of the motor, the q-current is distributed only between the two other phases, V and W. Since the q-current is in this case at right angles to the U-axis, its projection onto the U-axis disappears. In contrast, the phase current W always has an opposite mathematical sign to the phase current V. The applied q-current is therefore given by:

$$-i_W = i_V = \cos(30°) \cdot i_q \quad (1)$$

where $$i_U = 0 \text{ and } i_U + i_V + i_W = 0$$

As mentioned, it is already known from the prior art DE 10 2004 024 883 A1 from the same applicant for the two connections of the magnetic bearing coil to be connected to the phase outputs V and W of the converter. The rotor position information of the converter is frozen by hardware or software such that this results in a state for the converter as if the magnetic axis pointed fixedly and invariably in the direction of the stator, the phase direction U. The converter control loop, which normally controls the torque and therefore the magnitude of the q-current, now controls the current level in the magnetic bearing coil directly, without any current nominal value being set for the phase U which is not connected, because of the frozen rotor position angle. This results in any fault messages being suppressed which would otherwise be set if no current were flowing, even though a corresponding current nominal value for this phase is present at the converter. This use of a three-phase converter is known according to the prior art, to be precise both for driving magnetic bearings with a basic field winding and for magnetic bearings with a difference drive, which do not have a basic field winding.

The invention will now be further linked to this prior art.

Converters for driving electric motors pass a pulse-width-modulated voltage to the phase outputs U, V and W of the converter in order to produce the desired current. If the converter is now intended to drive a magnetic bearing with a basic field winding, this results in the disadvantage that all the coils of the magnetic bearing are coupled to one another by transformer action via the basic field winding. This is undesirable because the current regulators for the individual magnetic bearing converters undesirably influence one another via this coupling. However, if a magnetic bearing with a difference drive is present, then there is no such undesirable coupling, as a result of which the current regulators of the individual converters are not subjected to disturbances. It is particularly disadvantageous in this case, however, that considerably more converters are now required, specifically 2×N converters, where N is the number of magnetic bearings.

The present invention now deals in particular with the embodiment of the magnetic bearing as a difference-driven magnetic bearing, without any basic field winding. This therefore avoids the disadvantage of the increased number of converters by transferring the difference drive, which has to be carried out by two individual converters according to the prior art, to a single converter. This is made possible in that the d-current, which is regulated at zero according to the prior art, is now assigned a function, and this is not regulated at zero, but at a defined value.

Figure 6:
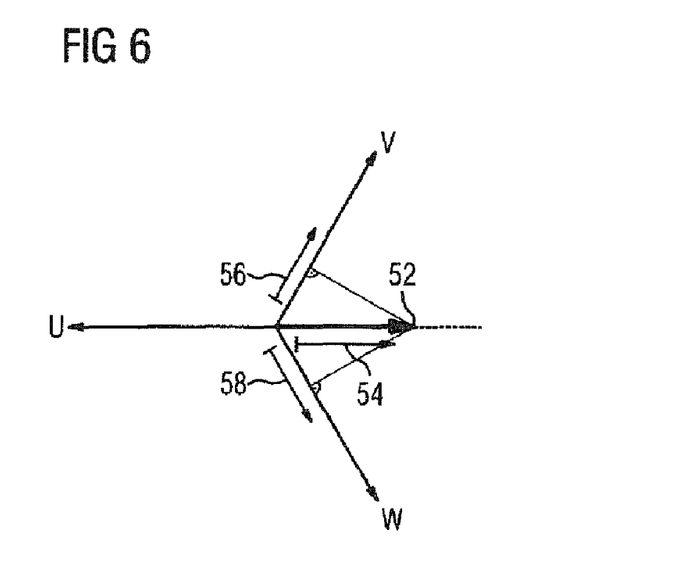
FIG. 6 shows the direction of the d-current in relation to the phase current for a difference-driven magnetic bearing, without a basic field winding.

This will now be explained in more detail with reference to FIG. 6.

In this context, an explanation will first of all be given as to how a d-current is distributed between the individual phases U, V, W for the predetermined rotor position with the magnetic axis 36 pointing in the direction of the phase U. The d-current is applied in field-weakening direction, as a result of which it points against the magnetic axis 36 and thus against the phase direction U.

The applied field-weakening d-current 52 is parallel to the phase direction U, as a result of which it can be projected completely in the direction of the phase U, but in the opposite orientation. The projections of the d-current in the phase directions V and W result in precisely half the magnitude of the d-current to be produced. The applied d-current is therefore given by:

$$i_V = i_W = -\frac{1}{2}i_U = -\frac{1}{2}i_d, \quad (2)$$

where $$i_U + i_V + i_W = 0.$$

In the case of the difference drive for a magnetic bearing coil pair, a constant current and a difference current are applied to the two coils. The constant current has the same mathematical sign in both coils, but the difference current has a different mathematical sign in the two coils. According to the prior art, the currents are at first added computationally and are then supplied as a nominal value to a respective amplifier, which means that a separate amplifier is provided for each of the two coils.

In contrast, the aim of the present invention is to use a single three-phase converter for the difference drive for a magnetic bearing coil pair, with the constant current being produced by a d-current, and the difference current by a q-current, from the same converter.

In this case, each of the coils of the magnetic bearing is connected by means of a connecting line to the phase V or W of the converter. The two other coil connecting lines are connected to one another, and are jointly connected to the phase U of the converter. This results in the following connection pattern, as illustrated in FIGS. 7 and 8.

In order to assist understanding, an illustration for the d-current 60 (FIG. 7) and for the q-current 64 (FIG. 8) has respectively been chosen in this case.

It should be noted that the respectively illustrated magnetic bearing coil pair is connected to a single three-phase converter. The separation in the two Figures is intended only to improve clarity.

Figure 7:
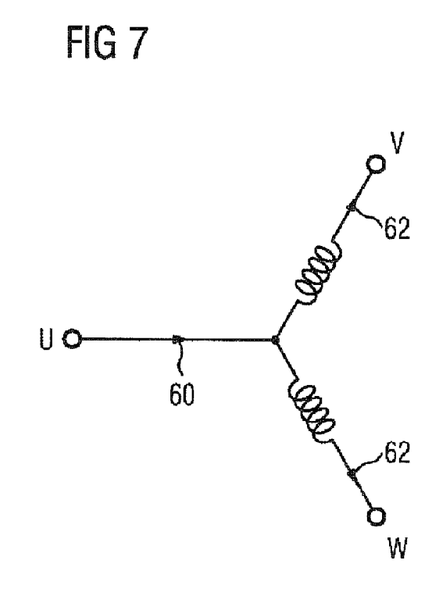
FIG. 7 shows a connection pattern of the coils of a magnetic bearing for the d-current.
Figure 8:
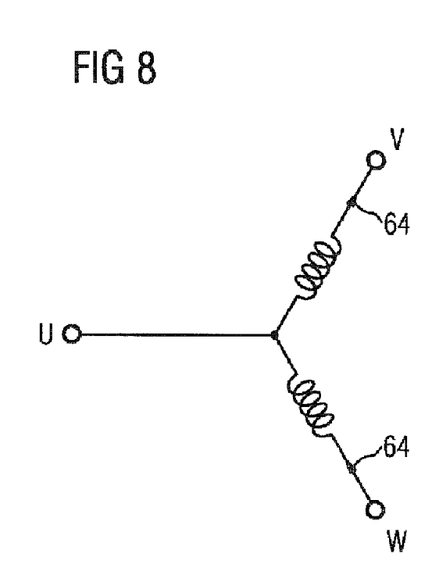
FIG. 8 shows a connection pattern of the coils of a magnetic bearing for the q-current.

FIG. 7 shows the distribution of the d-current 60 in the two coils of the magnetic bearing coil pair. The d-current 60 appears to be split half-and-half in each case as a current (which is counted as being positive) in both coils.

FIG. 8 shows the distribution of the q-current in said coils of the magnetic bearing coil pair. The q-current appears with the same level as being positive in the coil illustrated at the top and as being negative in the coil illustrated at the bottom. In FIGS. 7 and 8, a positive counting direction is in each case intended to be counted in the direction of the phases U, V and W into the converter.

If the d-current is now applied as a constant current and the q-current is used to drive a force effect, then all the requirements which have to be complied with for a difference drive for a magnetic bearing are satisfied. According to FIGS. 7 and 8, the d-current is assigned the function of the constant current $i_0$, and the q-current is subjected to the control function of the initially mentioned current $i_x$, which is intended to cause different current levels in the two coils of the magnetic bearing coil pair.

A difference drive according to the invention for a magnetic bearing assumes that both the d-current and the q-current can be generated independently of one another. This can be done by means of modern three-phase converters. In contrast to the prior art, no rotating field is now produced to drive a motor, but rather two currents are generated independently of one another, in order to operate a magnetic bearing in the form of a difference drive.

BRIEF DESCRIPTION OF THE DRAWING

Three exemplary embodiments of the invention will be described in the following text.

In the Figures.

DETAILED DESCRIPTION OF PREFERRED EMBODIMENTS

Figure 9:
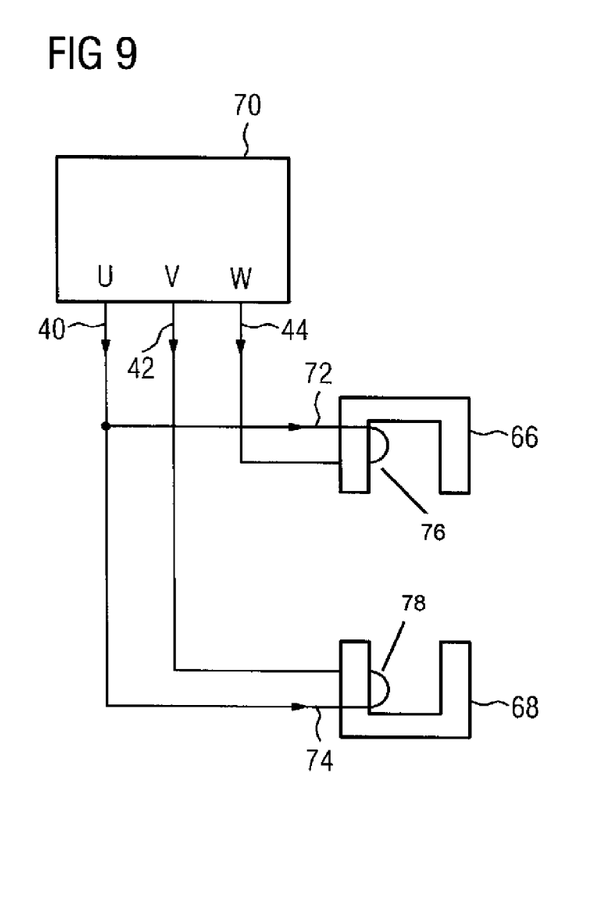
FIG. 9 shows a magnetic bearing control device according to the invention with a three-phase converter.
Figure 10:
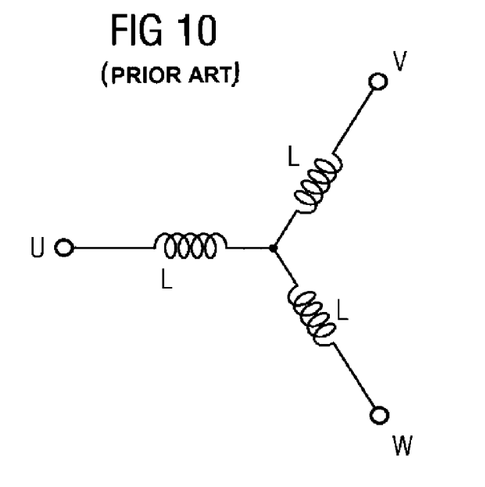
FIGS. 10 and 11 show star and delta circuits, respectively, which are known per se and are used for the connection according to the invention.
Figure 11:
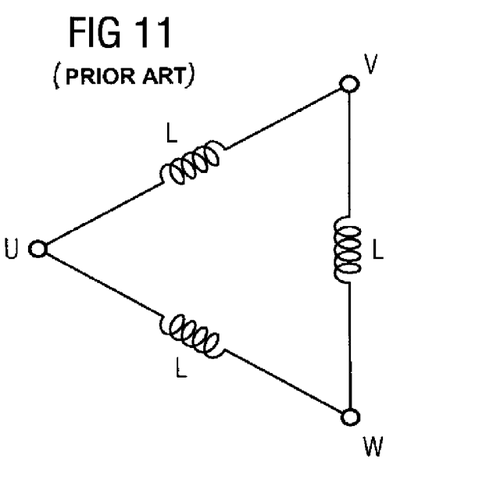

FIG. 9 shows a magnetic bearing control device according to the invention having a three-phase converter 70 whose phase current outputs U, V and W produce the phase currents 40, 42 and 44. The magnetic bearing has an upper magnet armature 66 and a lower magnet armature 68. A current 72 in this case flows in control field winding 76 of a magnet coil pair, wherein the control field winding 76 is associated with the upper magnet armature 66. The control field winding 76 is connected to the first and third phase current outputs U, W of the converter 70.

A current 74 flows in a second control field winding 78 of the magnet coil pair, wherein the control field winding 78 is associated with the lower magnet armature 68. The second control field winding 78 is connected to the first phase current output U and to the second phase current output V of the converter 70. With an assumed fixed rotor position angle=0°, the magnetic axis 36 pointing in the direction of the phase U, this then results in the following phase output currents 40, 42 and 44:

$$i_U = i_d \qquad (3)$$
$$i_V = -\frac{1}{2}i_d + \cos(30°) \cdot i_q$$
$$i_W = -\frac{1}{2}i_d - \cos(30°) \cdot i_q$$

$$i_a = -i_W = \frac{1}{2}i_d + \cos(30°) \cdot i_q \qquad (4)$$
$$i_b = -i_V = \frac{1}{2}i_d - \cos(30°) \cdot i_q$$

The phase current 40 ($i_U$) forms an applied d-current. The two other phase currents 42 and 44 are then calculated as stated in the other equations in equation system (3).

This results in the overall equation system (4) for the connection according to the invention, as indicated in FIG. 9.

The current $i_a$ corresponds to a current 72 which flows into the control field winding 76, which is associated with the upper magnet armature 66. The current $i_b$ describes a further current 74, which flows into the control field winding 78 of the magnet coil pair.

As can be seen from the equation systems (3) and (4), the current $i_d$ can be used to set so-called premagnetization, and the current $i_q$ increases the current in one of the coils and decreases it in the other, thus making it possible to set a resultant force on the object to be borne, preferably a rotor.

Converters according to the prior art are designed for operation of symmetrical polyphase motors. In this case, symmetrical means that the impedances between all three terminals of the converter are of the same magnitude.

However, this is not the case when the converter is connected according to the invention to the magnetic bearing coils. As has already been described in conjunction with FIGS. 7 and 8, the connection according to the invention may, for example, be regarded as an incomplete star circuit, without any inductance in the phase U and with the two coils of the magnetic bearing coil pair forming the inductances in the two other phases V and W. In precisely the same way, FIGS. 7 and 8 can also be regarded as an incomplete delta circuit, without any third inductance between the phases V and W.

These circuit asymmetries affect the current regulation. The asymmetry of the incomplete star circuit or incomplete delta circuit may, for example, be overcome by connecting a passive inductor in the phase branch which is lacking an impedance for symmetry in comparison to the complete star circuit or delta circuit, which inductor has an inductance that corresponds to the inductance of one coil of the magnet coil pair. It is also feasible to in each case subdivide the magnetic bearing coils and to use a subsection thereof as said passive inductor. The addition of said passive inductor therefore leads to an alternative type of connection for the magnetic bearing coil pair to a three-phase converter.

As a component, said passive inductor results in costs, however, produces heat losses and occupies physical space. The following text therefore proposes a preferred solution which overcomes the undesirable effects on the current regulator resulting from the asymmetry.

First of all, the effects on the current regulator will be explained with reference to FIGS. 7 and 8. Once again, it is assumed that the magnetic axis 36 is frozen in the direction of the phase U.

Equal parts 62 of the d-current 60 flow from the phase conductor U into the phase conductors V and W. In this case, no current flows from the phase conductor V to the phase conductor W, and vice versa. With regard to the d-current, it is therefore irrelevant whether the branch between V and W does or does not have a component. Insertion of the above-mentioned passive inductor would change nothing relating to this. The incomplete delta circuit is therefore changed to a complete delta circuit for the d-current. In the case of the d-current, the converter does not perceive the missing branch, because no current would flow in it in any case. For the current regulation of the d-current, the total inductance of a delta circuit with the individual branch inductances L therefore leads to a total inductance of ⅔×L.

The q-current flows from the phase conductor V to the phase conductor W, and vice versa. In this case, no current flows in the phase conductor U. It is therefore irrelevant for the case of the q-current whether the branch U has an inductance of magnitude L or is shorted out. The incomplete star circuit is therefore changed to a complete star circuit for the q-current. In the case of the q-current, the converter does not perceive the shorted-out branch U, because no current would flow in it in any case. For the current regulation of the q-current, the total inductance of a star circuit with the individual branch inductances L therefore leads to a total inductance of 2×L.

The inductance perceived by the converter therefore depends on whether the d-current or the q-current is applied. Computationally, there is a difference between the two inductances of 1:3. The voltage which is required to change the respective current component d or q likewise differs. Three times as much voltage is required to change the q-current as to change the d-current. Since the current regulator applies a voltage in order to change the current, it is proposed that a distinction be drawn in the magnitude of the voltage between the d-current and the q-current. For converters with a proportional current regulator, a structure is proposed in which the proportional gain for the d-current can be chosen to be less than that for the q-current. The ratio of the first proportional gain may be in the range from 1:2 to 1:4. If the inductance difference is taken into account in the current regulation, then there is no need to add a passive inductor to the incomplete star or delta circuit.

Figure 12:
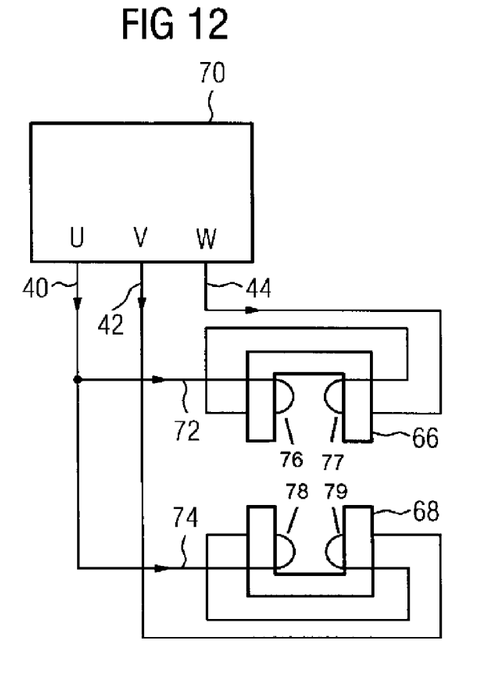
FIG. 12 shows a magnetic bearing control device according to the invention, with the three-phase converter in this case being used both for driving a basic field winding and for driving a control field winding.
Figure 13:
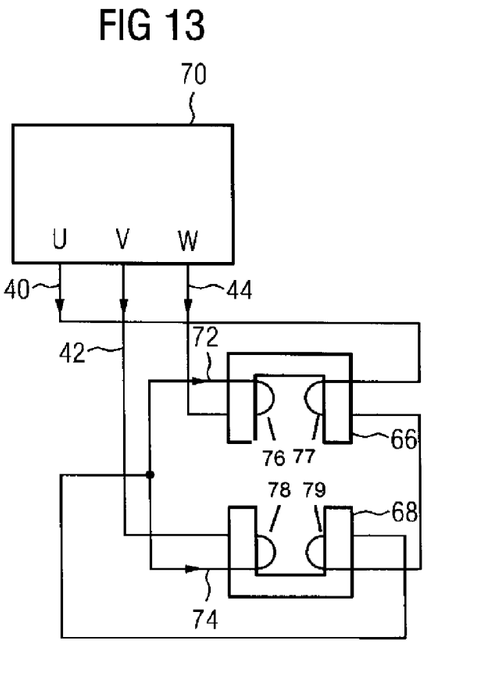
FIG. 13 shows an alternative embodiment to FIG. 12, which can be used particularly advantageously when the premagnetization winding is designed for a lower current than the control winding.

FIGS. 12 and 13 now show further circuit options for connection of magnetic bearings fitted with a control field winding 76 and a basic field winding 77 associated with the upper magnet armature 66, and with a control field winding 78 and a basic field winding 79 associated with the lower magnet armature 68 to a three-phase converter.

If the basic field winding 77, 79 is in this case designed for a lower current than the control field winding 76, 78, then the configuration shown in FIG. 13 is preferable.

The connection according to the invention of the converter to the coils of the magnet coil pair of the magnetic bearing is evident from FIGS. 12 and 13.

In summary, the invention can be briefly outlined as follows:

Power amplifiers are required to control magnetic bearings. According to the invention, the function of these power amplifiers is carried out by a three-phase converter, with all three phase current outputs of the converter being used to drive the coils of the magnet coil pair of the magnetic bearing. In this case, the invention makes use of the knowledge that not only can a converter produce a rotating field for a motor by independent setting of the phase currents, but that this capability to set the phase currents independently can also be used to drive a magnetic bearing coil pair.

The invention claimed is:

1. A method of controlling a magnetic bearing with a three-phase converter which has a proportional current regulator regulating a d-current and a g-current of the converter, the method comprising:

applying all three phase currents of the converter to control the magnetic bearing, generating with the converter from the three phase currents a constant current and a difference current, controlling a pair of magnet coils of the magnetic bearing with the constant current and the difference current, wherein the pair of magnet coils includes an upper magnet armature and a lower magnet armature, connecting a control field winding of upper magnet armature to a first phase current output and to a third phase current output of the three-phase converter, and connecting a control field winding of the lower magnet armature to the first phase current output and to a second phase current output of the three-phase converter, and setting a ratio of a gain of a first proportional amplifier regulating the d-current to a gain of a second proportional amplifier regulating the g-current in a range from 1:2 to 1:4.

2. The method of claim 1, wherein the pair of magnet coils forms exclusively control field windings in absence of basic field windings.

3. The method of claim 1, wherein the ratio is 1:3.

4. A method of controlling a magnetic bearing having a pair of magnet coils forming an upper magnet armature and a lower magnet armature, each coil having a basic field winding and a control field winding, with a three-phase converter which has a proportional current regulator regulating a d-current and a q-current of the converter, the method comprising:

connecting the basic field winding and the control field winding of the upper magnet armature in series, with the series connection being connected between a first phase current output and a third phase current output of the three-phase converter, and connecting the basic field winding and the control field winding of the lower magnet armature in series, with the series connection being connected between the first phase current output and a second phase current output of the three-phase converter, applying all three phase currents of the converter to control the magnetic bearing, wherein the three phase currents connected to the basic field winding produce a premagnetization current and the three phase currents connected to the control field winding produce a control current, and setting a ratio of a gain of a first proportional amplifier regulating the d-current to a gain of a second proportional amplifier regulating the q-current in a range from 1:2 to 1:4.

5. The method of claim 4, wherein the ratio is 1:3.

6. A method of controlling a magnetic bearing having a pair of magnet coils forming an upper magnet armature and a lower magnet armature, each coil having a basic field winding and a control field winding, with a three-phase converter which has a proportional current regulator regulating a d-current and a q-current of the converter, the method comprising:

connecting the basic field windings of the upper magnet armature and of the lower magnet armature in series, connecting the control field windings of the upper magnet armature and of the lower magnet armature in series, wherein the series-connected basic field windings have a tapping point from which a current flowing through the series-connected basic field windings of the upper and lower magnet armatures is supplied to the series-connected control field windings, applying all three phase currents of the converter to control the magnetic bearing, wherein the three phase currents connected to the basic field winding produce a premagnetization current and the three phase currents connected to the control field winding produce a control current, and setting a ratio of a gain of a first proportional amplifier regulating the d-current to a gain of a second proportional amplifier regulating the q-current in a range from 1:2 to 1:4.

7. The method of claim 6, wherein the ratio is 1:3.

* * * * *

UNITED STATES PATENT AND TRADEMARK OFFICE
CERTIFICATE OF CORRECTION

| | | |
|---|---|---|
| PATENT NO. | : 8,294,314 B2 | Page 1 of 1 |
| APPLICATION NO. | : 12/665506 | |
| DATED | : October 23, 2012 | |
| INVENTOR(S) | : Joachim Denk et al. | |

It is certified that error appears in the above-identified patent and that said Letters Patent is hereby corrected as shown below:

Column 10, claim 1, line 40: Change "g-current" to --q-current--

Signed and Sealed this
Fifteenth Day of January, 2013

David J. Kappos
*Director of the United States Patent and Trademark Office*